United States Patent [19]

Uemura et al.

[11] Patent Number: 5,248,708
[45] Date of Patent: Sep. 28, 1993

[54] ADHESIVE COMPOSITION CONSISTING PRIMARILY OF A-CYANOACRYLATE COMPOUND

[75] Inventors: Hiroshi Uemura, Muko; Ethuo Yosida, Kameoka, both of Japan

[73] Assignee: Ohara Paragium Chemical Co., Ltd., Kyoto, Japan

[21] Appl. No.: 866,989

[22] Filed: Apr. 10, 1992

[51] Int. Cl.$^5$ .......................... C08K 9/06; C08K 3/36
[52] U.S. Cl. .................... 523/212; 523/216; 524/492; 524/850
[58] Field of Search ............... 524/762, 850, 492, 555; 523/216, 212

[56] References Cited

U.S. PATENT DOCUMENTS

| | | | |
|---|---|---|---|
| 4,764,545 | 8/1988 | Yosida | 524/850 |
| 4,845,151 | 7/1989 | Sivy | 524/762 |
| 5,071,891 | 10/1991 | Harrison et al. | 523/216 |

*Primary Examiner*—Paul R. Michl
*Assistant Examiner*—Tae H. Yoon
*Attorney, Agent, or Firm*—Armstrong, Westerman, Hattori, McLeland & Naughton

[57] ABSTRACT

An α-cyanoacrylate adhesive composition including as the main components thereof:

(A) an α-cyanoacrylate prepared by the process having the steps of thermally depolymerizing a condensation product obtained from a cyanoacetic acid ester, and formaldehyde or a polymer thereof using as a catalyst a polymerizable imine represented by the formula

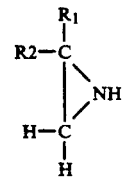

wherein $R_1$ and $R_2$ are the same or different and are each $CH_3$ or H to obtain a crude monomer, and rectifying the crude monomer, (B) a fine particulate silica having an absorbed and adsorbed water content of 0.08 to 1.30 wt % and 2.7 to 5.2 silanol groups/100 Å$^2$ on the surface thereof, and (C) an acid-treated (poly)-alkylene glycol.

2 Claims, No Drawing

ADHESIVE COMPOSITION CONSISTING PRIMARILY OF A-CYANOACRYLATE COMPOUND

BACKGROUND OF THE INVENTION

1. Field of the Invention

The present invention relates to adhesive compositions comprising an α-cyanoacrylate compound as a main component thereof and a fine particulate silica as a thixotropic agent.

2. Description of the Prior Art

Adhesive compositions comprising an α-cyanoacrylate compound as the main component thereof have found wide use as instantaneous adhesives. Examples of α-cyanoacrylate compounds for use in such compositions are methyl-α-cyanoacrylate, ethyl-α-cyanoacrylate, isobutyl-α-cyanoacrylate, n-butyl-α-cyanoacrylate, n-propyl-α-cyanoacrylate and similar alkyl-α-cyanoacrylates, allyl-α-cyanoacrylate, propargyl-α-cyanoacrylate and similar α-cyanoacryalates having an unsaturated group, 2-methoxyethyl-α-cyanoacrylate, 2-ethoxyethyl-α-cyanoacrylate and similar α-cyanoacrylates having an alkoxyl group and alkyloxyalkyl-α-cyanoacrylates, tetra-hydrofurfuryl-α-cyanoacrylate and similar special α-cyanoacrylates.

These α-cyanoacrylates have heretofore been industrially produced usually by the following process.

A condensation product is prepared by reacting a cyanoacetate with formaldehyde or a polymer thereof in an inert organic solvent in the presence of a basic catalyst, the resulting water is distilled off in the form of an azeotropic mixture with the solvent, the solvent is then distilled off, the product is thereafter subjected to thermal depolymerization in a vacuum in the presence of phosphorus pentoxide or like nonvolatile acid to obtain a crude α-cyanoacrylate, and the crude α-cyanoacrylate is purified by distillation.

The basic catalyst used in this process is usually a nonpolymerizable basic compound such as piperidine or similar amine, caustic soda, caustic potash, alkoxide of alkali metal or the like. The basic catalyst conventionally used is a compound which will not polymerize even if subjected to the action of acids and heat.

α-Cyanoacrylate compounds are used for instantaneous adhesives, which include one containing fine particulate silica to impart thixotropic properties to the adhesive.

However, the α-cyanoacrylate adhesive containing the fine particulate silica has the serious drawback of being low in stability.

Accordingly, a fine particulate silica has been developed which has its surface modified. More specifically, the hydrophilic hydroxyl on the surface of fine particulate silica is rendered hydrophobic or oleophilic, for example, by treatment with polydimethylsiloxane, trialkoxyalkylsilane or the like.

We have conducted continued research on α-cyanoacrylate adhesives of the type mentioned and conceived the novel idea of using a surface-untreated fine particulate silica as a thixotropic agent to eliminate the cumbersome procedure of surface-treating fine particulate silica before use and to develop α-cyanoacrylate adhesive having high stability.

On the other hand, we have conducted research also on processes for preparing α-cyanoacrylate compounds and consequently developed a process for preparing α-cyanoacrylate compounds which are well-suited for use in adhesives as a main component thereof. This process has been patented as U.S. Pat. No. 4,764,545.

SUMMARY OF THE INVENTION

An object of the present invention is to provide an α-cyanoacrylate adhesive composition having high stability with use of a surface-untreated fine particulate silica.

The above and other objects of the present invention will become apparent from the following description.

DETAILED DESCRIPTION OF THE INVENTION

The research we have conducted has matured to an adhesive composition which comprises an α-cyanoacrylate compound prepared by the process of U.S. Pat. No. 4,764,545, a specific surface-untreated fine particulate silica and a specific acid-treated (poly)-alkylene glycol. Our research has revealed that the use of these specific components gives exceedingly high stability to the adhesive composition.

The specific surface-untreated fine particulate silica must be 0.08 to 1.3 wt % in absorbed and adsorbed water content and 2.7 to 5.2/100 angstrom$^2$ in the number of silanol groups on the surface thereof.

Stated more specifically, the present invention provides an adhesive composition comprising as the main components thereof:

(A) a specific α-cyanoacrylate compound prepared by the process of U.S. Pat. No. 4,764,545, (B) a surface-untreated fine particulate silica having an absorbed and adsorbed water content of 0.08 to 1.3 wt % and 2.7 to 5.2 silanol groups/100 Å$^2$ of the surface thereof, and (C) an acid-treated (poly)-alkylene glycol.

The α-cyanoacrylate compound to be used in the present invention can be any of those prepared by the process as defined in U.S. Pat. No. 4,764,545. Thus, useful α-cyanoacrylate compounds are those prepared by any of the processes included in the process of U.S. Pat. No. 4,764,545. This patent discloses "a process for preparing an α-cyanoacrylate compound characterized by the steps of thermally depolymerizing a condensation product obtained from a cyanoacetic acid ester, and formaldehyde or a polymer thereof using as a catalyst a polymerizable imine represented by the formula

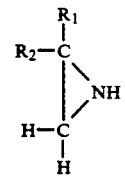

wherein R$_1$ and R$_2$ are the same or different and are each CH$_3$ or H to obtain a crude monomer, and rectifying the crude monomer.

The fine particulate silica to be used in the present invention is one which has not been surface-treated and which fulfills the above two requirements as to properties, as selected from among surface-untreated fine particulate silicas conventionally used as thixotropic agents for α-cyanoacrylate adhesives of the type mentioned.

The fine particulate silica to be used is usually 130±25 to 380±30 m$^2$/g, preferably about 200±25 to about 300±30 m$^2$/g, in specific surface area, and 0.08 to 1.3 wt %, preferably 0.08 to 1.1 wt %, in absorbed and adsorbed water content. When having a water content outside the specified range, the silica fails to give the desired stability to the adhesive composition.

The silica further has 2.7 to 5.2 silanol groups/100 Å$^2$, preferably 2.7 to 4.2 silanol groups/100 Å$^2$, on the surface thereof. If the number of silanol groups is outside the specified range, the adhesive composition fails to exhibit high stability.

The (poly)-alkylene glycol to be treated with an acid for use in the present invention is at least one of alkylene glycols and poly-alkylene glycols. Examples of useful glycols are (poly)-ethylene glycol, (poly)-propylene glycol, polytetramethylene oxide, blocked copolymer of ethylene oxide-propylene oxide, etc. Ethers and esters of such (poly)-alkylene glycols are also usable.

Examples of useful ethers and esters are mono- or di-alkyl ethers and esters. The alkyl groups in such alkyl ethers and esters are usually those having up to 18 carbon atoms. A usual polyether-modified silicone can be used in place of the (poly)-alkylene glycol.

The alkylene groups in the (poly)-alkylene glycols useful for the present invention are those having about 1 to about 4 carbon atoms and a molecular weight of 62 to 20,000, preferably about 1,000 to about 4,000.

For use in the present invention, the (poly)-alkylene glycol needs to be treated with an acid, whereby the glycol is made soluble in α-cyanoacrylates and usable with the specific fine particulate silica to be used as a thixotropic agent in the invention while assuring the resulting composition (i.e., the desired adhesive composition) of high stability.

The acid to be used for the acid treatment is usually an inorganic oxo acid or Lewis acid, and the method of treatment somewhat differs with the kind of acid to be used.

Treatment with Liquid Acid

The (poly)-alkylene glycol and the acid are placed into a container, for example, a measuring bottle with a closure, and the glycol is treated with the acid at room temperature or with slight heating (about 30° to about 35° C.) for 5 to 30 minutes. When in the form of a solid, the (poly)-alkylene glycol may be heated to the melting point. The acid is used in such an amount that when a cyanoacrylate adhesive composition is prepared using 0.2 wt % of the resulting (poly)-alkylene glycol and used for adhering iron to iron, the setting time of the composition will be 5 to 80 seconds.

Treatment with Gaseous Acid

The (poly)-alkylene glycol is placed into a glass container which has a cock and which can be evacuated to a vacuum of about 400 to about 500 mmHg, and the container is thereafter evacuated to a suitable vacuum to aspirate the gaseous acid and treat the glycol with the acid in the same manner as above. After the treatment, the portion of acid remaining unabsorbed by the glycol is removed under a pressure of about 400 mmHg at a temperature of 30° to 40° C.

More specific examples of useful acids are inorganic oxo acids such as $H_2SO_4$, $H_3PO_4$, $CH_3SO_3H$ and $C_2H_5SO_3H$ and Lewis acids such as $BF_3$, $BBr_3$ and $SO_2$. Some kinds of acids are usable in the form of an ether complex salt, exemplary of which is $BF_3$ ether complex salt.

The acid is used in an amount of 0.05 to 0.4 wt %, preferably about 0.1 to about 0.3 wt %, based on the (poly)-alkylene glycol. If the amount is less than 0.05 wt %, difficulty is encountered in dissolving the (poly)-alkylene glycol in α-cyanoacrylates, with a tendency for the desired composition to exhibit lower stability. If the amount is in excess of 0.4 wt %, the α-cyanoacrylate composition incorporating the glycol tends to exhibit a prolonged setting time.

The acid-treated (poly)-alkylene glycol acts as an auxiliary dispersant for uniformly dispersing the fine particulate silica in the α-cyanoacrylate compound and also forms a hydrogen crosslinking bond with the silanol on the surface of the silica, permitting the individual silica particles to readily form a chain or reticular structure.

When not treated with the acid, the (poly)-alkylene glycol will presumably act as a curing accelerator without participating in forming the hydrogen crosslinking bond with the silanol on the surface of fine particulate silica, failing to achieve the contemplated object.

The proportions of the three components for preparing the adhesive composition of the present invention are 100 parts by weight of the specified α-cyanoacrylate, 0.5 to 4.0 parts by weight, preferably 1.0 to 3.5 parts by weight, of the specified fine particulate silica, and 0.15 to 0.5 part by weight, preferably 0.15 to 0.4 part by weight, of the acid-treated (poly)-alkylene glycol.

If used in an amount of less than 0.5 part by weight, the fine particulate silica fails to give satisfactory thixotropy to the composition, whereas presence of more than 5.0 parts by weight of the silica results in lower stability and fails to form a satisfactory paste.

An amount of the acid-treated (poly)-alkylene glycol less than 0.15 part by weight will not uniformly disperse the silica, whereas amounts thereof more than 1.0 part by weight lead to lower stability.

According to the present invention, usual additives for use in α-cyanoacrylate adhesives of the type stated can also be incorporated into the adhesive composition.

The α-cyanoacrylate adhesive composition of the invention is usable for various application like those heretofore known and is very useful especially as an instantaneous adhesive composition.

The present invention will be described in greater detail with reference to the following examples.

EXAMPLE 1

Since hydrophilic fumed silica (one of surface-untreated fine particulate silicas) has the property of absorbing moisture and retaining absorbed and adsorbed water, the following experiment was conducted to check the silica for the influence of absorbed and adsorbed water.

Adhesive compositions were prepared from specified amounts of the components listed in Table 1 and checked for properties. The silicas used were samples, different in lot number, of fumed silicas of the same grade, i.e., "REOLOSIL QS-20" manufactured by Tokuyama Soda Co., Ltd., and "AEROSIL 200" manufactured by Nippon Aerosil Co., Ltd.

The results are listed in Table 1.

The details of some of the listed items are as follows.

Absorbed and adsorbed water content (listed as "Water content"):

The amount of reduction resulting from heating at 110° C. for 2 hours.

Acid-treated (poly)-alkylene glycol (listed as "Acid-treated glycol"):

Polypropylene glycol (2,000 in molecular weight) as treated with 0.3 wt % of methanesulfonic acid based on the weight the glycol at 33° C. for 20 minutes.

Silica A-1, Silica H-1:

Silica A or H as allowed to stand in a constant-temperature constant-humidity chamber (33°~35° C., 80~85% RH) for 72 hours for the absorption of moisture.

Ethyl-2-cyanoacrylate:

An α-cyano monomer prepared by the technique disclosed in U.S.Pat. No. 4,764,545 and made to contain 0.002 wt % of methanesulfonic acid, 2.8 wt % of PMMA and 0.03 wt % of hydroquinone.

tained and the result achieved by testing each composition for stability.

Compositions the same as those of Table 2 were prepared with use of commercial ethyl-2-cyanoacrylate produced by the conventional method in place of the specific ethyl-2-cyanoacrylate of the invention. When tested for stability, the compositions exhibited an increased viscosity or cured at a temperature of 70° C., 7 to 10 days later.

The silicas listed in Table 2 are 0.15 to 0.26 wt % in absorbed and adsorbed water content.

Acid-treated glycol:

Polypropylene glycol (2,000 in molecular weight) as

TABLE 1

| Silica | | Components of adhesive composition | | | Properties of composition | | |
|---|---|---|---|---|---|---|---|
| Kind of silica | Water content wt % | Ethyl-2-cyano-acrylate wt % | Acid-treated glycol wt % | Silica wt % | Appearance | Viscosity cps | Stability at 70° C. |
| REOLOSIL QS-20 | | | | | | | |
| Lot A | 0.08 | 96.8 | 0.2 | 3.0 | Pasty | 31,000 | Good for 20 days |
| B | 0.12 | 96.8 | 0.2 | 3.0 | Pasty | 32,000 | Good for 20 days |
| C | 0.24 | 96.8 | 0.2 | 3.0 | Pasty | 29,000 | Good for 20 days |
| D | 0.31 | 96.8 | 0.2 | 3.0 | Pasty | 24,000 | Good for 20 days |
| E | 0.47 | 96.8 | 0.2 | 3.0 | Pasty | 26,000 | Good for 20 days |
| F | 1.12 | 96.8 | 0.2 | 3.0 | Pasty | 21,000 | Good for 20 days |
| G | 1.30 | 96.8 | 0.2 | 3.0 | Pasty | 23,000 | Good for 15 days |
| A-1 | 2.04 | 96.8 | 0.2 | 3.0 | Fluid | 900 | Increased viscosity 7~8 days later |
| AEROSIL 200 | | | | | | | |
| Lot H | 0.06 | 96.8 | 0.2 | 3.0 | Pasty | 29,000 | Good for 20 days |
| I | 0.17 | 96.8 | 0.2 | 3.0 | Pasty | 30,000 | Good for 20 days |
| J | 0.24 | 96.8 | 0.2 | 3.0 | Pasty | 31,000 | Good for 20 days |
| H-1 | 2.75 | 96.8 | 0.2 | 3.0 | Fluid | 1,200 | Increased viscosity 6~7 days later |

Table 1 shows that the fine particulate silica is desirable when up to 1.3 wt % in absorbed and adsorbed water content.

treated with 0.3 wt % of methanesulfonic acid based on the weight thereof under the same condition as in Example 1.

TABLE 2

| Silica | | Components of adhesive composition | | | Properties of composition | |
|---|---|---|---|---|---|---|
| Kind of silica | Specific surface area m²/g | Ethyl-2-cyano-acrylate wt % | Acid-treated glycol wt % | Silica wt % | Viscosity cps | Stability at 70° C. |
| AEROSIL | | | | | | |
| 130 | 130 ± 25 | 96.75 | 0.25 | 3.0 | 17,000 | Good for 20 days |
| 200 | 200 ± 25 | 96.75 | 0.25 | 3.0 | 29,000 | Good for 20 days |
| 300 | 300 ± 30 | 96.75 | 0.25 | 3.0 | 31,000 | Good for 20 days |
| 380 | 380 ± 30 | 96.75 | 0.25 | 3.0 | 20,000 | Increased viscosity 10~12 days later |
| REOLOSIL | | | | | | |
| QS-10 | 140 ± 20 | 96.75 | 0.25 | 3.0 | 25,000 | Good for 20 days |
| QS-20 | 220 ± 20 | 96.75 | 0.25 | 3.0 | 32,000 | Good for 20 days |
| QS-30 | 300 ± 30 | 96.75 | 0.25 | 3.0 | 28,000 | Good for 20 days |
| QS-40 | 380 ± 30 | 96.75 | 0.25 | 3.0 | 33,000 | Good for 20 days |

EXAMPLE 2

An acid-treated (poly)-alkylene glycol (hereinafter referred to as an "acid-treated glycol") was admixed with ethyl-2-cyanoacrylate (α-cyano monomer prepared by the technique of U.S. Pat. No. 4,764,545 and caused to contain 0.002 to 0.0025 wt % of methanesulfonic acid, 2.8 wt % of PMMA and 0.03 wt % of hydroquinone), a fumed silica was then admixed with the mixture, and the resulting mixture was treated by a homomixer (1,500 to 1,700 r.p.m.) to prepare a dispersion, i.e., a composition. The same procedure as above was repeated using different kinds of fumed silicas. Table 2 shows the viscosity of the compositions ob-

EXAMPLE 3

Compositions were prepared using specified amounts of the components listed in Table 3, which also shows the properties of the compositions.

The details of listed items are as follows.

REOLOSIL SQ-20:

Fumed silica (200±20m²/g in specific surface area) manufactured by Tokuyama Soda Co., Ltd.

Ethyl-2-cyanoacrylate:

α-Cyanoacrylate prepared by the technique of U.S. Pat. No. 4,764,545 (made to contain 2.8 wt % of PMMA, 0.002 wt % of methanesulfonic acid and 0.03 wt % of hydroquinone).

Acid-treated glycol:

Polypropylene glycol (2,000 in molecular weight) as treated with 0.3 wt % of methanesulfonic acid based on the weight thereof under the same condition as in Example 1.

Viscosity:

Measured by a Brookfield rotational viscometer (using rotor No. 4 at 6 r.p.m., or rotor No. 2 at 12 r.p.m. for viscosities of not lower than 1,000 cps).

Setting time:

O-rings of NBR (6.2 mm in outside diameter) were cut vertically, the composition was applied to one of the cut surfaces of each ring, and the cut surfaces were then adhered together. The rings were thereafter forcibly separated one after another with both hands at an interval of 5 seconds to determine the length of time (setting time) taken for the ring to become no longer separable.

Stability test:

Samples of the composition (2 to 3 g, as placed in a polyethylene tube and an aluminum tube) were allowed to stand in a constant-temperature chamber at a temperature of 70°±2° C. and checked for changes with time.

AEROSIL RY-200:

Hydrophobic fumed silica obtained by surface-treating "AEROSIL 200" manufactured by Nippon Aerosil Co., Ltd. with polydimethylsiloxane.

Table 3 reveals that the amount of fumed silica to be used is 0.5 to 4.0 wt %, preferably 1.0 to 3.5 wt %.

% of hydroquinone) using these compounds in the amounts listed in Table 4, admixing a fumed silica with the solution and treating the mixture in a homomixer (or in a suitable dispersing device for applying a shearing force to the mixture) at 1,000 to 3,000 r.p.m. to disperse the silica.

The compositions were tested for properties. Samples (3 g) of these compositions were placed into polyethylene or aluminum containers and tested for stability.

Table 4 show the results.

The acid-treated glycol was prepared by placing 20 g of polypropylene glycol, about 2,000 in molecular weight, into a measuring bottle having a capacity of about 50 ml, then placing 0.12 g of boron trifluoride ether complex salt (47%) into the bottle quickly, and stirring the mixture by a magnetic stirrer for 10 to 15 minutes with the bottle closed for acid treatment.

The details of listed items are as follows.

R-972:

Hydrophobic fumed silica surface-treated with dimethyldichlorosilane.

RX-200:

Hydrophobic silica treated with hexamethylenedisilazane

RY-200:

Fumed silica treated with polydimethylsiloxane (product of Nippon Aerosil Co., Ltd.).

MT-10:

TABLE 3

| Components of adhesive composition | | | Proerties of composition | | |
| --- | --- | --- | --- | --- | --- |
| Ethyl-2-cyano-acrylate wt % | Silica REOLOSIL QS-20 wt % | Acid-treated glycol wt % | Viscosity cps | Setting time sec. | Stability at 70° C. |
| Composition of invention | | | | | |
| 100.00 | 0.0 | 0.0 | 2.13 | 5~10 | Good for 20 days |
| 99.35 | 0.5 | 0.15 | 120 | 10~15 | Good for 20 days |
| 99.15 | 0.7 | 0.15 | 990 | 10~15 | Good for 20 days |
| 98.85 | 1.0 | 0.15 | 2,300 | 10~15 | Good for 20 days |
| 98.30 | 1.5 | 0.20 | 4,700 | 10~15 | Good for 20 days |
| 97.80 | 2.0 | 0.20 | 10,600 | 15~20 | Good for 20 days |
| 97.30 | 2.5 | 0.20 | 15,000 | 15~20 | Good for 20 days |
| 96.88 | 3.0 | 0.12 | 250 | 20~25 | Silica separated 3 days later |
| 96.75 | 3.0 | 0.25 | 29,200 | 15~20 | Good for 20 days |
| 96.70 | 3.0 | 0.30 | 29,700 | 15~20 | Good for 20 days |
| 96.65 | 3.0 | 0.35 | 30,200 | 15~20 | Good for 20 days |
| 96.60 | 3.0 | 0.40 | 30,300 | 15~20 | Increased viscosity 17~18 days later |
| 96.50 | 3.0 | 0.50 | 29,600 | 15~20 | Increased viscosity 14~15 days later |
| 96.00 | 3.0 | 1.00 | 32,100 | 10~15 | Increased viscosity 17~18 days later |
| 96.25 | 3.5 | 0.25 | 37,000 | 20~30 | Increased viscosity 14~15 days later |
| 95.75 | 4.0 | 0.25 | 70,000 | 30~50 | Increased viscosity 14~15 days later |
| 94.70 | 5.0 | 0.30 | hard pasty | 30~50 | Increased viscosity 5~6 days later |
| 93.70 | 6.0 | 0.30 | hard pasty | 30~50 | Increased viscosity 5~6 days later |
| Comp. Ex. | | | | | |
| AEROSIL RY-200 | | | | | |
| 95.0 | 5.0 | — | 11,500 | 15~20 | Good for 20 days |
| 93.0 | 7.0 | — | 22,600 | 15~20 | Good for 20 days |
| 89.0 | 11.0 | — | 41,400 | 35~40 | Good for 15 days |

EXAMPLE 4

Adhesive compositions each in the form of a uniform paste were prepared by dissolving an acid-treated glycol in ethyl-2-cyanoacrylate (cyanoacrylate monomer prepared by the technique of U.S. Pat. No. 4,764,545 and made to contain 2.8 wt % of PMMA, 0.002 wt % of boron trifluoride ether complex salt (47%) and 0.03 wt Fumed silica treated with dimethyldichlorosilane (product of Tokuyama Soda Co., Ltd.).

Absorbed and adsorbed water content (listed as "Water content"), silanol density:

As determined by the manufacturer.

Tensile shear strength:

Measured according to JIS K6861, Item 6 using Autograph S-200, product of Shimadzu Seisakusho Ltd.

TABLE 4

| Silica | | | Components of adhesive composition | | |
| --- | --- | --- | --- | --- | --- |
| Kind of | Water content | Silanol density | Ethyl-2- | Acid-treated | Silica |

TABLE 4-continued

| silica | wt % | —SIOH/100Å² | cyanoacrylate wt % | glycol wt % | wt % |
|---|---|---|---|---|---|
| REOLOSIL QS-20 | | | | | |
| Lot A | 1.02 | 5.21 | 96.8 | 0.2 | 3.0 |
| B | 1.30 | 4.16 | 96.8 | 0.2 | 3.0 |
| C | 0.53 | 3.53 | 96.8 | 0.2 | 3.0 |
| D | 0.12 | 2.65 | 96.8 | 0.2 | 3.0 |
| D | 0.12 | 2.65 | 96.8 | 0.2(not treated with acid) | 3.0 |
| AEROSIL 200 | | | | | |
| Lot E | 0.16 | 2.71 | 96.8 | 0.2 | 3.0 |
| E | 0.16 | 2.71 | 96.8 | 0.2(not treated with acid) | 3.0 |
| AEROSIL | | | | | |
| R-972 | 0.05 | up to 1.2 | 96.8 | 0.2 | 3.0 |
| RX-200 | 0.06 | up to 1.2 | 96.8 | 0.2 | 3.0 |
| RY-200 | 0.02 | up to 1.2 | 96.8 | 0.2 | 3.0 |
| REOLOSIL MT-10 | | | | | |
| RX-200 | 0.06 | up to 1.2 | 92.0 | 0 | 8.0 |
| RY-200 | 0.02 | up to 1.2 | 94.0 | 0 | 6.0 |
| MT-10 | 0.03 | up to 1.2 | 90.0 | 0 | 10.0 |

| Silica | Properties of Composition | | | |
|---|---|---|---|---|
| Kind of silica | Viscosity cps | Setting time sec. | Tensile shear strength | Stability at 70° C. |
| REOLOSIL QS-20 | | | | |
| Lot A | 39,000 | 30~35 | 151 | Increased viscosity 10~12 days later |
| B | 23,000 | 20~25 | 149 | Good for 15 days |
| C | 28,900 | 15~20 | 132 | Good for 20 days |
| D | 32,000 | 20~25 | 165 | Good for 20 days |
| D | 26,000 | 15~20 | 159 | Increased viscosity 5~6 days later |
| AEROSIL 200 | | | | |
| Lot E | 31,000 | 20~30 | 157 | Good for 20 days |
| E | 28,000 | 15~20 | 135 | Increased viscosity 6~7 days later |
| AEROSIL | | | | |
| R-972 | 1,400 | | 142 | Increased viscosity 8~10 days later |
| RX-200 | 1,600 | | 125 | Increased viscosity 5~7 days later |
| RY-200 | 4,500 | | 150 | Increased viscosity 8~10 days later |
| REOLOSIL MT-10 | | | 134 | Increased viscosity 10~12 days later |
| RX-200 | 26,000 | | 153 | Good for 20 days |
| RY-200 | 16,000 | | 136 | Good for 20 days |
| MT-10 | 19,000 | | 145 | Good for 20 days |

EXAMPLE 5

As shown in Table 5, adhesive compositions were prepared by admixing an acid-treated glycol and a hydrophilic fumed silica with ethyl-2-cyanoacrylate (α-cyanoacrylate prepared by the technique of U.S. Pat. No. 4,764,545 and made to contain 2.8 wt % of PMMA, 0.002 wt % of methanesulfonic acid and 0.03 wt % of hydroquinone). Table 5 also shows the results obtained by testing the compositions for viscosity and stability.

The table also shows the results achieved by comparative compositions which were prepared without using any acid-treated glycol.

The acid-treated glycols given in Table 5 are as follows.

A: Polypropylene glycol (2,000 in molecular weight) as treated with 0.3 wt % of methanesulfonic acid based on the weight thereof.

B: Polyethylene glycol (6,000 in molecular weight) as treated with 0.5 wt % of $(C_2H_5)_2O.BF_3$ based on the weight thereof.

C: Propylene glycol as treated with 0.08 to 0.1 wt % of methanesulfonic acid based on the weight thereof.

D: Ethylene glycol as treated with 0.15 to 0.2 wt % of $(C_2H_5)_2O.BF_3$ based on the weight thereof.

E: Polyethylene glycol dimethacrylate as treated with 0.3 wt % of methanesulfonic acid based on the weight thereof in the same manner as in Example 1.

F: Polyether-modified silicone (SH8700, product of Toray Dow Corning Co., Ltd.) as treated with 0.5 wt % of $(C_2H_5)_2O.BF_3$ based on the weight thereof.

TABLE 5

| Components of adhesive composition | | | Properties of composition | | |
|---|---|---|---|---|---|
| Ethyl-2-cyanoacrylate wt % | Acid-treated glycol wt % | fumed silica wt % | Appearance | Viscosity cps | Stability at 70° C. |
| Composition of invention | | | | | |
| 96.2 | A 0.3 | AEROSIL 200 3.5 | Pasty | 34,000 | Good for 20 days |
| 96.2 | B 0.3 | AEROSIL 200 3.5 | Pasty | 55,000 | Good for 20 days |

TABLE 5-continued

| Components of adhesive composition | | | Properties of composition | | |
|---|---|---|---|---|---|
| Ethyl-2-cyanoacrylate wt % | Acid-treated glycol wt % | fumed silica wt % | Appearance | Viscosity cps | Stability at 70° C. |
| 94.5 | C 2.5 | REOLOSIL QS-20 3.0 | Pasty | 26,000 | Good for 10 days |
| 95.0 | D 2.0 | REOLOSIL QS-20 3.0 | Pasty | 28,000 | Good for 10 days |
| 95.7 | E 0.3 | QS-20 4.0 | Pasty | 70,000 | Good for 20 days |
| 96.2 | F 0.3 | QS-20 3.5 | Pasty | 33,000 | Good for 10 days |
| Comp. Ex. | | | | | |
| 97.0 | none | AEROSIL 200 3.0 | Silica did not disperse uniformly, composition gelled and adhered to stirrer during dispersal. Not usable as adhesive. | | |
| 97.0 | none | REOLOSIL QS-20 3.0 | | | |

EXAMPLE 6

As listed in Table 6, adhesive compositions were prepared from methyl-2-cyanoacrylate (containing 20 ppm of $SO_2$, 200 ppm of hydroquinone and 2.0 wt % of PMMA) or 2-methoxyisopropyl-2-cyanoacrylate (containing 25 ppm of boron trifluoride ether complex salt, 100 ppm of hydroquinone and 3 wt % of hydroxypropyl cellulose acetate (19.5% in acetylation degree, about 2,000 in polymerization degree)), a hydrophilic fumed silica and an acid-treated glycol (polypropylene glycol, 2,000 in molecular weight, as treated with methanesulfonic acid). These compositions were tested for properties with the results given in Table 6.

The table also shows the results achieved by comparative compositions which were prepared using a hydrophobic fumed silica in place of the hydrophilic fumed silica.

using as a catalyst a polymerizable imine represented by the formula

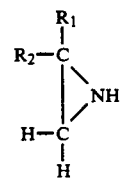

wherein $R_1$ and $R_2$ are the same or different and are each $CH_3$ or H to obtain a crude monomer, and rectifying the crude monomer, (B) a fine particulate silica having an absorbed and adsorbed water content of 0.08 to 1.30 wt % and 2.7 to 5.2 silanol groups/100 $Å^2$ on the surface thereof, and

TABLE 6

| Components of adhesive composition | | | Properties of composition | | | |
|---|---|---|---|---|---|---|
| Ethyl-2-cyanoacrylate wt % | Silica wt % | Acid-treated glycol wt % | Viscosity cps | Setting time sec. | Tensile shear strength | Stability at 70° C. |
| Composition of invention | | | | | | |
| Methyl ester | QS-20 3.0 | 0.2 None | 27,500 | 15~20 | 182 | Good for 15 days |
| 2-Methoxyisopropyl ester | QS-20 3.0 | 0.2 None | 32,000 | 20~25 | 115 | Good for 15 days |
| Comp. Ex. | | | | | | |
| Methyl ester | RY-200 6.0 | 0.2 None | 16,300 15,500 | 15~20 10~15 | 176 179 | Silica not dispersed / Poor dispersal of silica, became turbid / Increased viscosity 5 days later / Slightly Increased viscosity 10 days later |
| 2-Methoxyisopropyl ester | RY-200 6.0 | 0.2 None | 12,000 13,600 | 15~20 20~25 | 107 120 | Increased viscosity 5~6 days later / Increased viscosity 12 days later |

What is claimed is:

1. An α-cyanoacrylate adhesive composition comprising as the main components thereof:
   (A) an α-cyanoacrylate prepared by the process having the steps of thermally depolymerizing a condensation product obtained from a cyanoacetic acid ester, and formaldehyde or a polymer thereof
   (C) a polyether-modified silicone prepared by treating a silicone with a $BF_3$ ether complex salt.

2. The composition of claim 1, wherein about 0.5 weight percent of $(C_2H_5)_2O.BF_3$, based on the weight of said silicone, is used to treat said silicone.

* * * * *